United States Patent

Speicher

[15] 3,645,178

[45] Feb. 29, 1972

[54] APPARATUS FOR EXPOSING PHOTORESIST IN CYLINDERS

[72] Inventor: Charles G. Speicher, Apalachin, N.Y.

[73] Assignee: International Business Machines Corporation, Armonk, N.Y.

[22] Filed: Mar. 27, 1969

[21] Appl. No.: 811,151

[52] U.S. Cl. .......... 95/1, 95/16, 355/85

[51] Int. Cl. .......... G03b 37/00

[58] Field of Search .......... 95/1, 15, 16, 17, 11 HC; 96/36.2; 355/85

[56] References Cited

UNITED STATES PATENTS

| | | | |
|---|---|---|---|
| 2,834,915 | 5/1958 | Dench | 315/39.3 |
| 3,080,232 | 3/1963 | Gilbody et al. | 96/36.2 |
| 3,410,641 | 11/1968 | Bergman | 331/94.5 |
| 3,506,839 | 4/1970 | Ando et al. | 250/222 |

*Primary Examiner*—Samuel S. Matthews
*Assistant Examiner*—Richard M. Sheer
*Attorney*—Hanifin and Jancin and Homer L. Knearl

[57] ABSTRACT

A photoresist coating on a cylinder is exposed by placing a mask loosely inside the cylinder and then shining a nondivergent beam of light down the center of the cylinder and onto a conical mirror. The conical mirror reflects the light radially outward through the mask to expose the photoresist on the inner surface of the cylinder. Photoresist on the outside of the cylinder may also be exposed in the same manner by placing a conical mirror around the periphery of the cylinder. To expose the entire length of the cylinder, the conical mirror is moved gradually along the length of the cylinder.

9 Claims, 3 Drawing Figures

INVENTOR
CHARLES G. SPEICHER
BY Homer L. Knearl
AGENT

APPARATUS FOR EXPOSING PHOTORESIST IN CYLINDERS

CROSS-REFERENCES TO RELATED APPLICATIONS

This invention is a companion invention to the invention in copending, commonly assigned, application, Ser. No. 811,023, entitled "Apparatus for Exposing Photoresist in Cylinders," invented by K.N. Karol, and filed on the same day.

BACKGROUND OF THE INVENTION

This invention relates to a method and apparatus for exposing photoresist patterns on the inside and outside surfaces of a cylinder. More particularly, the invention relates to exposing photoresist patterns on the surfaces of cylinders by use of loosely fitting masks and nondivergent beams of radiant energy which are directed along the radii of the cylinder.

In motors used for high-speed feeding of web or tape material, it is desirable to have a motor armature which has very low inertia. Such an armature permits the motor rotational direction to change almost instantaneously from a high forward speed to a high reverse speed. One way to obtain an armature with low inertia is to use a cylinder with a current printed thereon. The problem then evolves into how to manufacture a printed circuit cylindrical armature. The cylinder which makes up the armature must be very light in weight and yet structurally strong. These characteristics exist in a cylinder made out of nonconductive materials, such as fiber glass, with conductive coatings on the inside and outside surfaces. The windings of the armature are formed on the cylinder by use of printed circuit techniques. In the past, three methods have been utilized to obtain a printed circuit armature.

In one method, the printed circuit is printed and etched in a flat configuration as is the typical printed circuit procedure. When the circuit has been etched, the sheet on which it is etched is then formed into a cylinder with abutting ends of the sheet being fastened together. This method is not satisfactory because the joint, where the ends of the sheet are fastened together, is not structurally strong enough to withstand the forces on the cylinder when the armature is instantaneously changed in rotational direction from high-speed forward to high-speed reverse.

Another method for achieving circuits inside a cylinder is to plate the entire cylinder so that its entire inner surface is coated with an electrically conductive material. The cylinder is then mounted on a mechanical inscribing unit. The inscribing unit utilizes an arm with a needle mounted on the end thereof to pass inside the cylinder and scrape away unwanted portions of the conductive material coated on the cylinder. After the inscribing process is completed a circuit configuration is left inside the cylinder.

The inscribing method is not satisfactory because of the mechanical limitations of inscribing miniature parts. For example, it may be necessary to inscribe the inner wall of the cylinder so as to leave two conductive paths a few thousandths of an inch apart. It is very difficult for a mechanical inscriber to be consistently that accurate. As a result, a great number of armatures are improperly inscribed and must be rejected as unusable. This is a very wasteful and costly means of manufacturing armatures.

Accordingly, the ideal method to obtain a circuit in a cylinder would be to coat the inside of the cylinder with a photoresist, place a mask inside the cylinder, expose the mask pattern on the photoresist, and use the exposed photoresist as a mask for etching a circuit pattern on the inside of the cylinder. The problem herein is that it is not possible to use conventional exposure techniques because the mask cannot be placed sufficiently close to the inside of the cylinder to allow accurate exposure of circuit pattern on the inside of the cylinder.

In the normal photoresist exposure situation, a mask is physically in contact with the photoresist material. Cylinders do not lend themselves to this technique since it is difficult, if not impossible, to place a mask inside a cylinder and insure that the mask is making good contact with the entire inside surface of the cylinder. In addition, if it were possible to assure good contact with the inside surface of the cylinder, there is the additional problem of how to remove the mask after the exposure. Also, in a manufacturing process involving large quantities, the procedure for exposing a photoresist must be rapid and easy to accomplish.

It is an object of this invention to manufacture printed circuit armatures in an efficient, highly reliable manner with very little or no manufacturing waste due to improper circuit configuration on the armatures.

It is another object of this invention to expose a photoresist inside a slender cylinder.

It is another object of this invention to expose a photoresist inside or outside a cylinder without the necessity of having a mask in tight contact with the walls of the cylinder.

SUMMARY OF INVENTION

In accordance with the above objects, the invention is accomplished by placing a mask loosely inside a cylinder whose inside surface is coated with photoresist. A nondivergent light beam is then directed into the cylinder with its beams being substantially parallel to the axis of a cylinder. The light beams are reflected by a conical mirror inside the cylinder with the axis of the conical mirror lying on the axis of the cylinder. Light reflected from the conical mirror is radially collimated—collimated in radial planes—and passes through the mask to expose the photoresist on the inside surface of the cylinder.

As another feature of the invention, the conical mirror is moved along the entire length of the cylinder to expose the entire cylinder. If the conical mirror is as long as the cylinder, then it need not be moved.

As another feature of the invention, a photoresist on the outside surface of the cylinder may be exposed by placing a mask loosely around the cylinder and using an outside conical mirror whose axis also lies on the axis of the cylinder. This mirror reflects the nondivergent light radially in toward the outside surface of the cylinder.

The great advantage of this invention is that the inner or outer mask may be loosely mounted relative to the cylinder whose photoresist is being exposed. The accuracy of the pattern printed on the photoresist, by exposure through the masks, will be preserved by use of nondivergent light which is moving along a radius of the cylinder. Thus, a true pattern with clear and distinct edges will be exposed in the photoresist.

Another advantage of the invention is that by having the cylinder and masks loosely mounted relative to each other, the cylinder may be rapidly removed from the masks after the exposure is completed.

Another advantage of the invention is that the structural integrity of the armature is preserved since it is one continuous piece. The armature is much stronger than if it were a flat piece rolled and bonded to form a cylinder. As one continuous piece, the armature is better able to withstand forces it will later encounter when used in a motor.

Still another advantage of the invention is that by using a mask and photo exposure method to print the circuit on the cylinders, the size of the printed circuit paths and their separation on the cylinder can be as small as desired—down to thousands of an inch. Also, the circuit pattern can have paths in any direction since the light is normal to the mask as it strikes the mask.

The foregoing and other objects, features and advantages of the invention will be apparent from the following more particular description of a preferred embodiment of the invention, as illustrated in the accompanying drawings.

BRIEF DESCRIPTION OF DRAWINGS

FIG. 2 taken along lines 2—2 of FIG. 1, shows a cross section of the masks and cylinder and the relative position of the inner and outer conical mirrors to the cylinder.

FIG. 3, taken along lines 3—3 of FIG. 1, shows a top view looking down into the cylinder with a cutaway of the cylinder so that the cylinder and mask may be seen edge on.

DESCRIPTION

Figure 1:
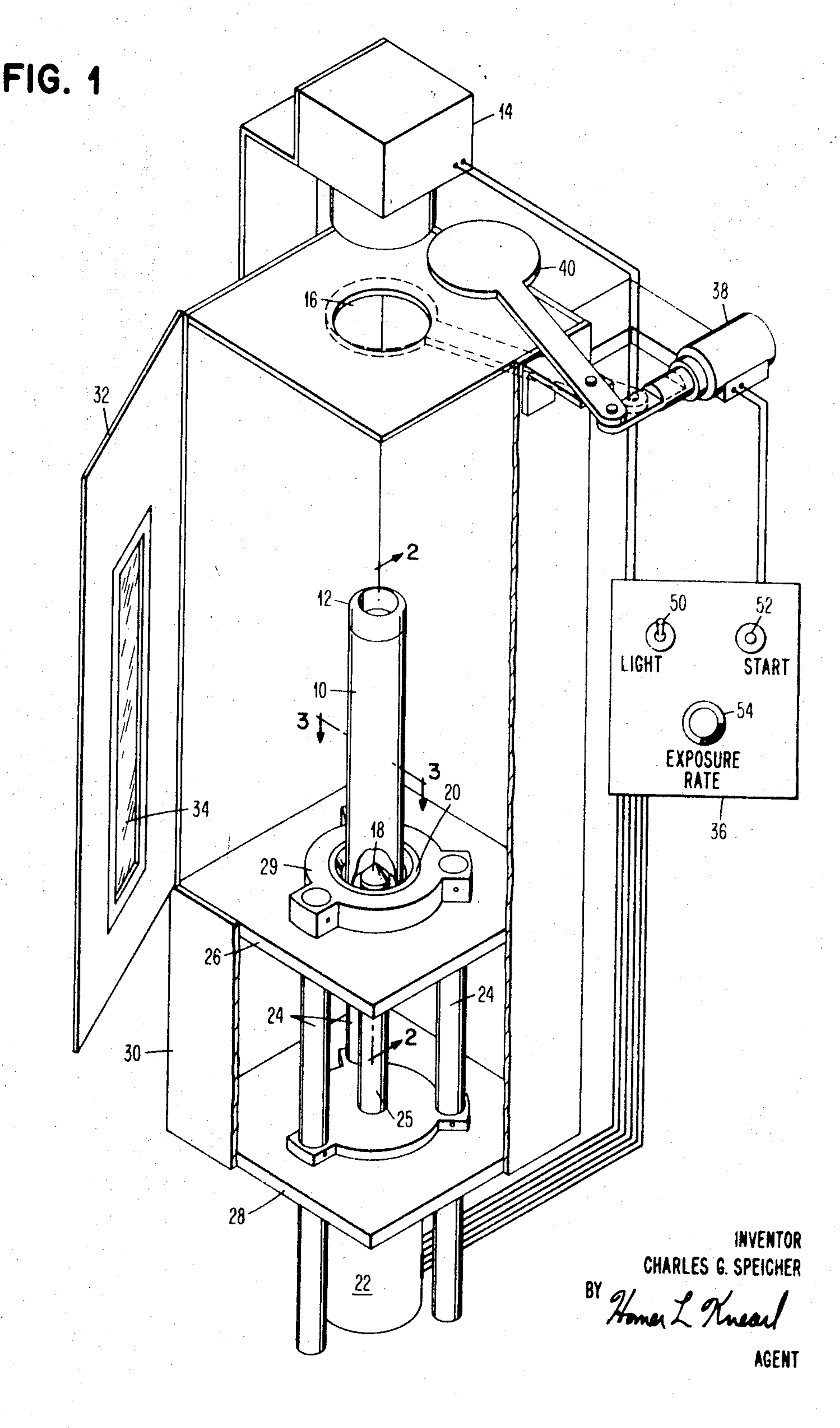
FIG. 1 shows the preferred embodiment of the invention wherein the photoresist on the surfaces of the cylinder is being exposed.

In FIG. 1, the cylinder to be exposed is placed inside the mask 10. A cap 12 is placed on top of the mask-cylinder-mask structure to prevent light from striking the end edges of the masks and the cylinder. The source of light is a laser and beam expander assembly 14 at the top of the drawing.

The laser and beam expander assembly is made up of commercially available argon lasers and beam expanders. For example, the laser could be any of the following devices: (1) Model 140 by Spectra-Physics, located at Mountain View, California, (2) Model LG-12 by Raytheon, located at Waltham, Massachusetts, or (3) Model 3410 by Resalab, located at Menlo Park, California. The beam expander could be any of the following: (1) Model 280 by Tropel, located at Fairport, New York, of (2) Model 331/332 by Spectra-Physics. The laser is the source of the substantially nondivergent beam. The beam expander increases the cross-sectional area of the beam while preserving the nondivergent character of the beam.

Of course, the laser beam is monochromatic so the photoresist must be matched to the beam. The above-identified lasers are argon lasers producing a blue-green light. Kodak Ortho Photo Resist by Eastman Kodak is a photoresist responsive to the wavelength generated by these lasers.

Light from the laser assembly 14 passes down through the hole 16 and into the chamber where the masks and cylinder are located. The nondivergent laser beam from assembly 14 passes through the hole 16 and strikes the inner conical mirror 18. The light reflects off the mirror and moves radially outward until it strikes either the mask or passes through the mask and strikes the inside surface of the cylinder.

The nondivergent beam from the assembly 14 also passes along the outside of the mask 10 and strikes the conical mirror 20. The mirror 20 reflects the nondivergent beam radially in toward the mask 10 and the outer surface of the cylinder. Light reflected off the conical mirror 20 will either strike the mask 10 or will be passed by the mask 10 to impinge on the outer surface of the cylinder.

In order to expose the entire cylinder, the inner conical mirror 18 and the outer conical mirror 20 are moved along the length of the cylinder. The movement is hydraulically actuated by hydraulic device 22 and is guided by the rods 24 passing through fixed plates 26 and 28. The plates 26 and 28 are a part of the box 30 which provides the lighttight chamber in which the cylinders are exposed. Access to the chamber is via door 32 which contains a dark glass window 34. The box 30 also serves as support for the laser assembly 14 which is fixedly mounted on the box.

Control of the exposure operation is provided by control box 36 which has electrical circuits for controlling operation of the laser assembly 14, the hydraulic device 22 and the shutter solenoid 38.

The shutter solenoid 38 operates to move the shutter 40 over the opening 16 before and after the exposure operation.

Figures 2, 3:
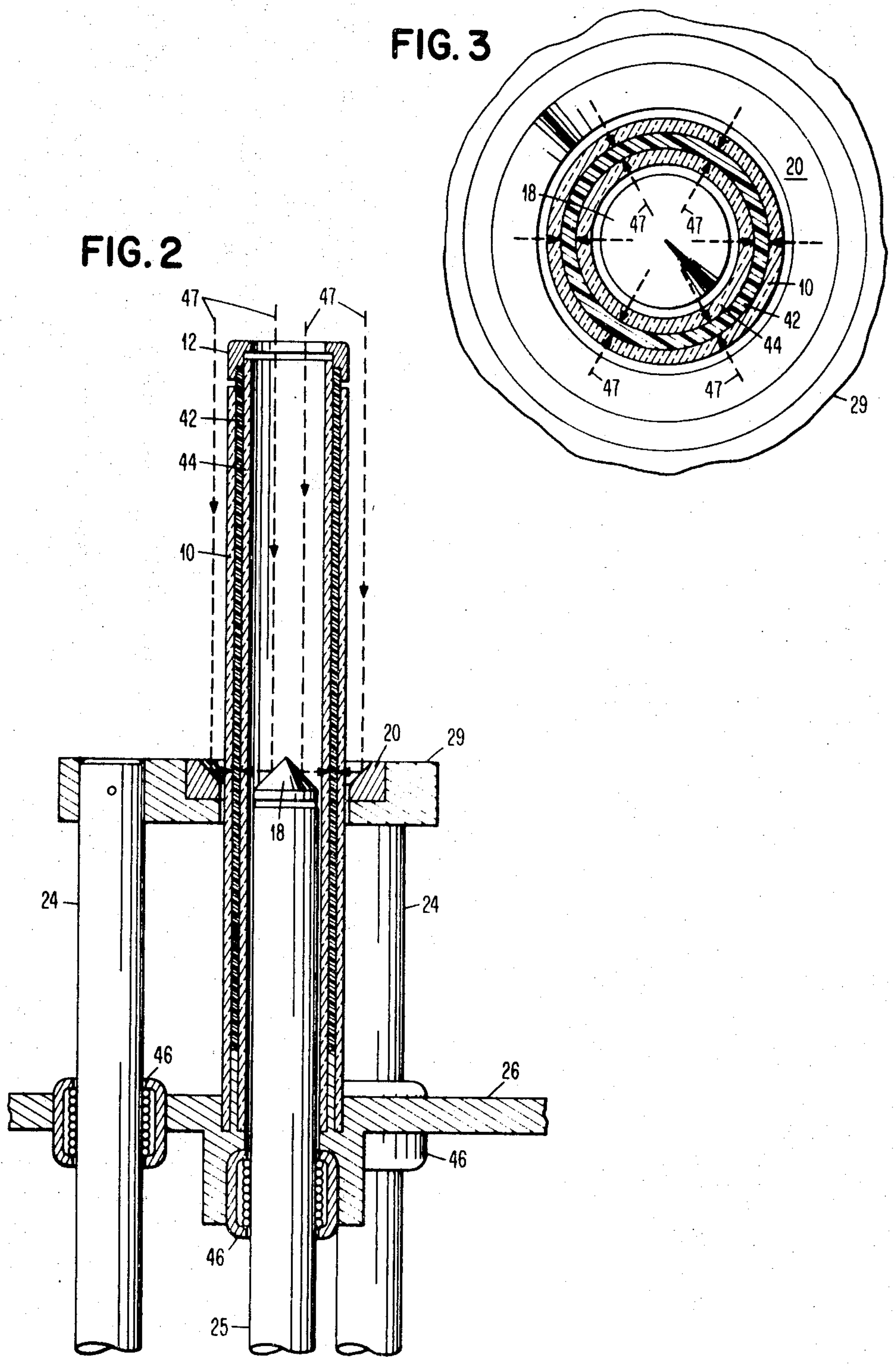

The position of the cylinder relative to the masks and mirrors may be more clearly seen in FIGS. 2 and 3. In FIG. 2, the outer mask 10 is shown in immediate proximity to the cylinder 42 and the inner mask 44. Cap 12 is shown at the top of FIG. 2 in position over the masks and cylinder. In FIG. 2 the masks and cylinder are shown in contact. If the drawing were greatly enlarged, it would be clear that there is spacing of a few hundredths to a few thousandths of an inch between the outer surface of the cylinder and mask 10 and also between the inner surface of the cylinder 42 and the mask 44. Thus, the cylinder 42 may be easily inerted or removed by sliding between the two masks 10 and 44.

The outer mask 10 and the inner mask 44 are seated in the base plate 26. The cylinder is placed in the apparatus for exposure by sliding it down between the two masks. Thereafter, the cap 12 is placed on top of the cylinder and mask so as to prevent light from impinging on the upper edge of the masks and cylinder.

In FIG. 2 the inner conical mirror 18 and the outer conical mirror 20 are shown in a position about half way along the length of the cylinder. The mirrors 18 and 20 may be any polished surface which will reflect the light radially towards the masks and cylinder. Mirror 18 is physically mounted on the end of piston 25, while mirror 20 is carried on a platform 29 physically attached to the end of rods 24. As piston 25 is pushed upward by the hydraulic device 22 (FIG. 1), platform 29 is also carried upward. Of course, the direction in which the mirrors move during exposure—from top to bottom or from bottom to top—is not critical to the exposure of the photoresist on the cylinder. Either direction would provide an operative method of exposure. The piston 25 and the rods 24 are allowed to slide through the platform 26 by the bearings 46.

As shown in FIG. 2, light beams arriving at the top of FIG. 2 in a direction parallel to the axis of the cylinder strike the conical mirror 18 and are reflected radially out toward the mask 44 and the inner surface of the cylinder 42. Similarly, light rays parallel to the axis of the cylinder 42 pass along the outside of the mask 10, strike the mirror 20 and are reflected radially in toward the mask 10 and the outer surface of the cylinder 42.

In FIG. 3, the radial direction of the light beams 47 as they move from the mirrors 18 and 20 to the cylinder 42 is shown.

OPERATION

Referring again to FIG. 1, a photoresist coated cylinder may be placed into position for exposure by removing the cap 12 and sliding the cylinder down between the outer mask 10 and the inner mask 44 (FIG. 2). With the door 32 closed and the shutter 40 over the opening 16, the chamber then is relatively lighttight.

To initiate operation, the operator flicks the light switch 50 which turns on the laser assembly 14. After a short interval during which the laser reaches full intensity, the operator then presses the start button 52. The start command causes the hydraulic device 22 to raise the mirrors 18 and 20 to the top of the cylinder. A microswitch, which is a part of hydraulic device 22 and is not shown, signals the control box 36 when the mirrors are at the top of the cylinder. The control box 36 then actuates the solenoid 38, which swings the shutter 40 away from the opening 16. The nondivergent light beams then pass down through the opening 16 to begin the exposure sequence.

During exposure the hydraulic device 22 slowly lowers the mirrors 18 and 20. The rate at which the mirrors are lowered may be controlled by rotating control dial 54. This effectively adjusts the time of exposure. When the mirrors reach the bottom of the cylinder, another microswitch, which is also a part of the hydraulic device 22, senses the mirror position and signals the control box 36 that the exposure is complete. The control box 36 in turn deactivates the solenoid 38. The shutter 40 then again closes over the opening 16.

The cylinder may then be removed by lifting cap 12 and sliding the cylinder from between the masks.

It will be obvious to one skilled in the art that there are many variations in mounting hardware and control hardware which might be used to implement the invention. However, the gist of the invention is the combination of nondivergent light with conical mirrors to convert the light into radial beams. The radial beams pass through masks to the inner or outer surface of a cylinder to expose a very accurate pattern in a photoresist. Of course, the size of the cylinder exposed is immaterial.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for exposing a pattern in a photoresist layer coated on a cylinder comprising:

means for masking radiant energy whereby a shadow pattern is projected onto the photoresist layer, said means mounted adjacent to, but not attached to, the photoresist layer on the inside surface of the cylinder so that the cylinder is slidable relative to said masking means;

a source of substantially nondivergent radiant energy positioned for directing a nondivergent radiant energy beam inside the cylinder and parallel to the axis of the cylinder;

means positioned inside the cylinder for reflecting the nondivergent radiant energy beam radially outward so that the radiant energy travels along the radii of the cylinder to pass through said masking means and expose a pattern in the photoresist layer on the inside surface of the cylinder.

2. The apparatus of claim 1 wherein said masking means comprises a cylindrical, optical mask positioned loosely inside the cylinder.

3. The apparatus of claim 1 wherein said source comprises:

a laser for generating a nondivergent beam;

beam expanding means for expanding the nondivergent laser beam to a larger cross-sectional area.

4. The apparatus of claim 1 wherein said reflecting means is a conical mirror with the axis of the cone positioned on the axis of the cylinder and with the cone's outside surface being the reflecting surface.

5. The apparatus of claim 4 and, in addition:

means for moving the conical mirror along the length of the cylinder to expose the photoresist on the entire inside surface of the cylinder.

6. The apparatus of claim 1 and, in addition:

second means for masking radiant energy whereby a shadow pattern may be projected onto the photoresist layer, said second masking means mounted adjacent to, but not attached to, the photoresist layer on the outside surface of the cylinder so that the cylinder is slidable relative to said second masking means;

said source also positioned for directing a nondivergent radiant energy beam outside the cylinder and parallel to the axis of the cylinder;

means positioned outside the cylinder for reflecting the nondivergent radiant energy beam radially inward so that the radiant energy travels along the radii of the cylinder in toward said second masking means and exposes a pattern in the photoresist layer on the outside surface of the cylinder.

7. The apparatus of claim 6 wherein said second masking means comprises a cylindrical optical mask positioned loosely outside the cylinder.

8. The apparatus of claim wherein said reflecting means positioned outside the cylinder is a conical mirror with the axis of the cone positioned on the axis of the cylinder and with the cone's inside surface being the reflecting surface.

9. The apparatus of claim 8 and, in addition, means for moving the outside conical mirror along the length of the cylinder to expose the photoresist layer on the entire surface of the cylinder.

* * * * *